(12) United States Patent
Makinouchi et al.

(10) Patent No.: US 7,601,947 B2
(45) Date of Patent: Oct. 13, 2009

(54) ENCODER THAT OPTICALLY DETECTS POSITIONAL INFORMATION OF A SCALE

(75) Inventors: Susumu Makinouchi, Zama (JP); Toru Imai, Natori (JP); Akihiro Watanabe, Sendai (JP)

(73) Assignee: Nikon Corporation, Tokyo (JP)

(*) Notice: Subject to any disclaimer, the term of this patent is extended or adjusted under 35 U.S.C. 154(b) by 61 days.

(21) Appl. No.: 11/798,255

(22) Filed: May 11, 2007

(65) Prior Publication Data

US 2007/0267571 A1  Nov. 22, 2007

Related U.S. Application Data

(60) Provisional application No. 60/808,541, filed on May 26, 2006.

(30) Foreign Application Priority Data

May 19, 2006  (JP) ............................. 2006-139658
Jan. 31, 2007  (JP) ............................. 2007-020632

(51) Int. Cl.
    *G01B 9/02* (2006.01)
(52) U.S. Cl. ........................... 250/231.13; 250/231.18; 250/237 G
(58) Field of Classification Search ................................. 250/231.13–231.18, 237 G
    See application file for complete search history.

(56) References Cited

U.S. PATENT DOCUMENTS 6,639,686 B1  10/2003  Ohara

FOREIGN PATENT DOCUMENTS

| EP | 0 451 780 A1 | 10/1991 |
|---|---|---|
| JP | A-4-265805 | 9/1992 |
| JP | A 2005-3438 | 1/2005 |
| JP | A-2005-326231 | 11/2005 |
| JP | A-2005-326232 | 11/2005 |

*Primary Examiner*—Georgia Y Epps
*Assistant Examiner*—Tony Ko
(74) *Attorney, Agent, or Firm*—Oliff & Berridge, PLC

(57) ABSTRACT

When an incident light is obliquely incident on an index scale, the optical path length of light A becomes longer than the optical path length of light B and an optical path length difference occurs, which causes a phase difference in both of the diffracted lights incident on a photodetection element. According to the phase difference, intensity of a photoelectric detection signal output from the photodetection element changes. That is, due to a periodic change in the incident angle of the incident light, the phase difference between light A and light B is modulated, and the interference signal becomes greatly modulated.

9 Claims, 8 Drawing Sheets

US 7,601,947 B2

ENCODER THAT OPTICALLY DETECTS POSITIONAL INFORMATION OF A SCALE

CROSS-REFERENCE TO RELATED APPLICATIONS

This non-provisional application claims the benefit of Provisional Application No. 60/808,541 filed May 26, 2006, the disclosure of which is hereby incorporated herein by reference in its entirety.

BACKGROUND OF THE INVENTION

1. Field of the Invention

The present invention relates to encoders, and more specifically to an encoder that optically detects positional information of a scale.

2. Description of the Background Art

Conventionally, as a typical optical encoder, a so-called diffraction interference type encoder is known, which is equipped with a diffraction grating that moves with a movable body and also has a grating formed at an equal distance in a direction orthogonal to the movement direction, an irradiation optical system that irradiates two coherent interference beams on the diffraction grating, and a detector that makes a positive diffracted light and a negative diffracted light of the same order diffracted by the diffraction grating interfere with each other so as to detect intensity variation of the interference beam, and detects the movement amount of the diffraction grating based on the intensity variation of the interference beam (for example, refer to Kokai (Japanese Patent Unexamined Application Publication) No. 2005-3438).

Meanwhile, in recent years, proposals have been made on optical encoders whose detection accuracy has been increased by improving the S/N ratio (e.g. refer to U.S. Pat. No. 6,639,686 Description). This encoder is equipped with a scale that has a grating placed along the movement direction of the movable body, and a probe that makes a beam vibrate along the arrangement direction of the grating on the scale. By making the beam vibrate in the arrangement direction of the grating, the probe modulates a signal including information related to the relative position of the scale that uses the vibration center of the beam as the reference position. Then, by demodulating the signal output from the probe using a drive signal that makes the beam vibrate, the relative position between the beam and the scale is detected. Generally, in such an encoder, the detection accuracy is higher the higher the modulation efficiency is.

Recently, proposals are made related to the diffraction interference type encoder described above of modulating light that has been received for the purpose of improving the S/N ratio or the like, and improvement in the modulation efficiency is required.

SUMMARY OF THE INVENTION

The present invention has been made in consideration of the circumstances described above, and according to the first aspect of the present invention, there is provided an encoder, comprising: a first optical member on which an illumination light is incident and where a first light and a second light are generated from different positions; a change unit that changes an incident angle of the illumination light with respect to the first optical member; and a second optical member that is relatively displaced with respect to the first optical member, wherein the first light and the second light are made to be incident on the same position of the second optical member and to interfere.

According to the encoder, the first light and the second light that are incident on the same position of the second optical member and interfere are generated in the first optical member at different positions. If the incident angle of the illumination light to the first optical member is changed in this state, a large optical path difference occurs between the first light and the second light and the phase difference between the first light and the second light will be greatly modulated, which improves the modulation efficiency of the interference lights that interfere in the second optical member.

According to the second aspect of the present invention, there is provided an encoder, comprising: a branching optical system that branches an illumination light to a first light and a second light; a first scale on which the first light is irradiated that has a first pattern which is relatively displaced with respect to the branching optical system and is also arranged along a relatively displaced direction; a first photodetection system that receives the first light via the first scale; a second scale on which the second light is irradiated that has a second pattern whose positional relation with respect to the branching optical system is fixed and is also arranged along a predetermined direction; a second photodetection system that receives the second light via the second scale; a modulation optical system that modulates the illumination light to a direction corresponding to the arrangement direction of the first pattern and the arrangement direction of the second pattern; and a computing unit that computes information related to a distance between the branching optical system and the first scale, based on photodetection results of the first photodetection system and photodetection results of the second photodetection system.

According to this encoder, in addition to the photodetection results of the first light via the first scale that is relatively displaced with respect to the branching optical system, the photodetection results of the second light via the second scale whose positional relation with respect to the branching optical system is fixed can be obtained. And, when these photodetection results are compared, other than the positional information related to the measurement direction of the first scale, it becomes possible to compute information related to the positional shift of the first scale in a direction orthogonal to the measurement direction.

DESCRIPTION OF THE EMBODIMENTS

An embodiment of the present invention will be described below, with reference to FIGS. 1 to 6.

Figure 1:
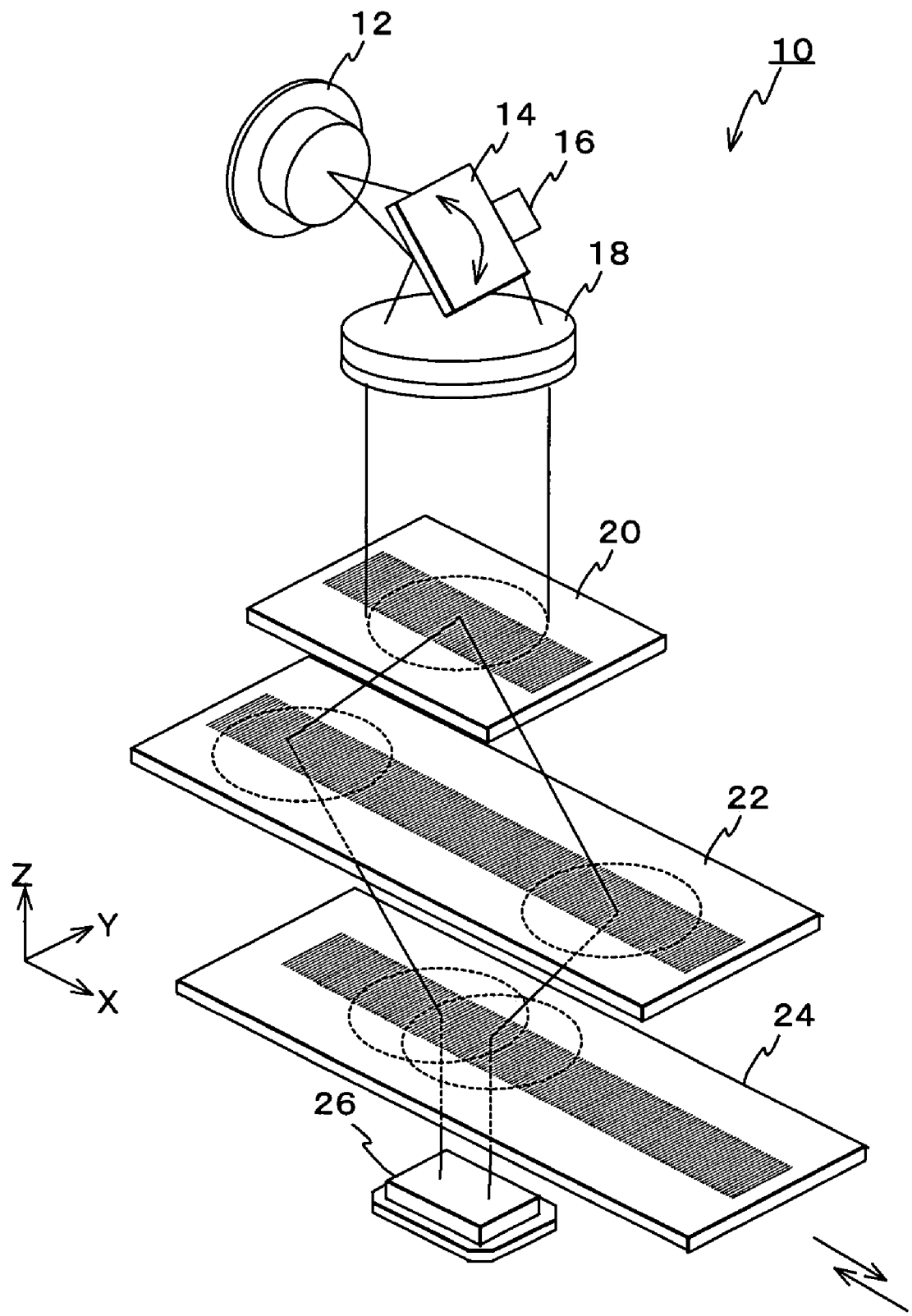
FIG. 1 is a view showing a schematic arrangement of a main section of an encoder related to an embodiment of the present invention.

FIG. 1 shows an entire configuration of a main section of an encoder 10 related to an embodiment of the present invention. As is shown in FIG. 1, encoder 10 is a so-called diffraction interference type encoder, and is a linear encoder that detects the movement direction, the movement amount, or the displacement of a movable body that moves in a predetermined direction (an X-axis direction).

As is shown in FIG. 1, encoder 10 is equipped with a light source 12, a vibration mirror 14, a collimator lens 18, index scales 20 and 22, a movement scale 24, and a photodetection element 26.

Light source 12 emits a coherent light, such as for example, a laser beam of a wavelength λ (=850 nm), toward the +X direction in FIG. 1.

Vibration mirror 14 reflects the laser beam from light source 12 towards index scale 20. Vibration mirror 14 rotationally vibrates periodically in a rotational direction around a Y-axis by a drive unit 16, which has an actuator. And, by the rotational vibration, the reflection direction of the light incident on vibration mirror 14 becomes different depending on the direction of the reflection surface, and the angle of the illumination light that is incident on collimator lens 18 becomes periodically modulated.

Collimator lens 18 converts the laser beam reflected off vibration mirror 14 into a parallel beam.

Index scale 20 is a transmissive type phase grating consisting of a plate on which a diffraction grating with a period direction in the X-axis direction is formed, and the parallel beam that has passed through collimator lens 18 enters index scale 20. In index scale 20, a plurality of diffracted lights is generated based on the incident parallel beam. Of the diffracted lights, ± first-order diffracted lights (in FIG. 1, the diffracted light outgoing from the +X side is to be a +1$^{st}$ order diffracted light, and the diffracted light outgoing from the −X side is to be a −1$^{st}$ order diffracted light) generated in index scale 20 are shown in FIG. 1.

Similar to index scale 20, index scale 22 is a transmissive type phase grating consisting of a plate on which a diffraction grating with a period direction in the X-axis direction is formed, and index scale 22 is placed in between index scale 20 and movement scale 24. Index scale 22 diffracts the −1$^{st}$ order diffracted light generated in index scale 20 and generates a +1$^{st}$ order diffracted light. This +1$^{st}$ order diffracted light proceeds toward movement scale 24. Further, index scale 22 diffracts the +1$^{st}$ order diffracted light generated in index scale 20 and generates a −1$^{st}$ order diffracted light. This −1$^{st}$ order diffracted light proceeds toward movement scale 24.

A part of the ± first-order diffracted lights generated in index scale 22 overlaps and interferes with each other in movement scale 24.

Similar to index scales 20 and 22, movement scale 24 is a transmissive type phase grating consisting of a plate on which a diffraction grating with a period direction in the X-axis direction is formed. In movement scale 24, the +1$^{st}$ order diffracted light generated in index scale 22 is diffracted so as to generate a −1$^{st}$ order diffracted light, while the −1$^{st}$ order diffracted light generated in index scale 22 is diffracted so as to generate a +1$^{st}$ order diffracted light.

The ± first-order diffracted lights outgoing from movement scale 24 are incident on photodetection element 26 in the interfered state. As a consequence, photodetection element 26 outputs a photoelectric conversion signal that shows the interference intensity of the interference light. As it will be described later, positional information of movement scale 24 will be detected, based on the photoelectric conversion signal.

In the description below, the diffracted light on the +X side shown in FIG. 1 will be described as the +1$^{st}$ order diffracted light, and the diffracted light on the −X side shown in FIG. 1 will be described as the −1$^{st}$ order diffracted light.

Figure 2:
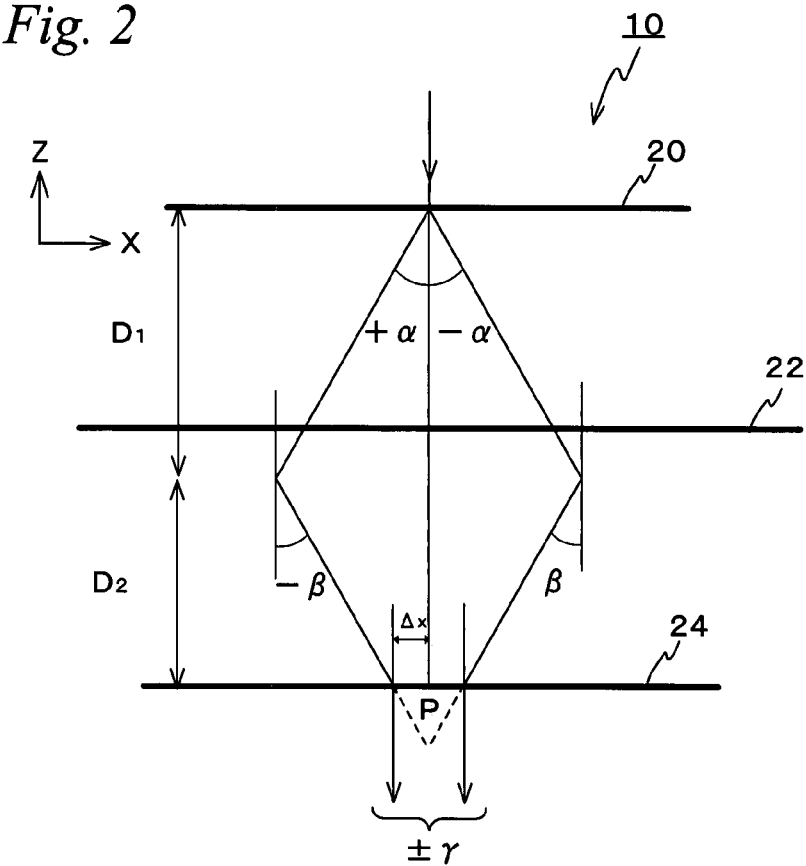
FIG. 2 is a view showing a modulation (No. 1) of the encoder in FIG. 1.

FIG. 2 shows a drawing of an optical path in a state where the laser beam is perpendicularly incident on index scale 20. As is shown in FIG. 2, the distance between index scale 20 and index scale 22 is to be $D_1$, and the distance between index scale 22 and movement scale 24 is to be $D_2$. And, in the embodiment, the distance between the scales is set so that $D_1 \ne D_2$.

When grating pitch of index scale 20 is indicated as P1, grating pitch of index scale 22 is indicated as P2, and grating pitch of movement scale 24 is indicated as P3, then, various values can be set as P1, P2, and P3. Therefore, the following expressions can be set.

$$P1=P3=p,\ P2=p/2 \quad (1)$$

$$P1 \ne P2 \ne P3,\ \text{however},\ 1/P3=1/P2-1/P1 \quad (2)$$

In the case of (1) and in the case of (2), the modulated state of the interference light received by photodetection element 26 is different. Therefore, in the description below, the cases will be described for (1) and also for (2) as necessary.

When the laser beam is perpendicularly incident on index scale 20, ±1$^{st}$ order diffracted lights having angles of ±α are generated (the angle of the +1$^{st}$ order diffracted light is −α and the angle of the −1$^{st}$ order diffracted light is +α). After a ±1$^{st}$ order diffraction occurs (diffraction angle ±β) further to these diffracted lights in index scale 22, the diffracted lights are incident on movement scale 24 where a ±1$^{st}$ order diffraction occurs again, and the diffracted lights are emitted at angles of ±γ.

Now, the case will be described of (1), that is, when P1=P3=p and P2=p/2. For example, p can be set as p=4 μm. In this case, angles α, β, and γ can be defined as in the following equations.

$$\sin \alpha = \lambda/P1 = \lambda/p$$

$$\sin \beta = \lambda/P2 - \sin \alpha = \lambda/p = \sin \alpha$$

$$\sin \gamma = \lambda/P3 - \sin \beta = 0$$

From the equations above, it can be seen that in the case of (1), α=β, and γ=0.

More specifically, in the case of (1), because $D_1 \ne D_2$ and α=β, the ±1$^{st}$ order diffracted lights emitted from one point in index scale 20 are not incident on the same point on movement scale 24 as is shown n FIG. 2. Now, supposing that $D_1=D_2$, then the ±1$^{st}$ order diffracted lights emitted from one point in index scale 20 are incident on the same point on movement scale 24, and when the shift between this point and the actual incident point of the ±1$^{st}$ order diffracted lights in the X-axis direction is expressed as Δx, then Δx can be expressed as in the following equation.

$$\Delta x = (D_1 - D_2) * \tan \alpha$$

In the case the laser beam is perpendicularly incident on index scale 20, the optical path length of the +1$^{st}$ order diffracted light and the −1$^{st}$ order diffracted light generated in index scale 20 is the same, and when the optical path length is described as L, L can be described as $L=(D_1+D_2)/\cos \alpha$. In this case, light intensity I of the interference fringe of movement scale 24 can be expressed as follows.

Equation 1

$$\begin{aligned}
I &= |\exp(jkL - j2\pi\Delta x/p - jkx \cdot \sin\alpha) + \\
&\quad \exp(jkL - j2\pi\Delta x/p + jkx \cdot \sin\alpha)|^2 \\
&= |2\cos(kx \cdot \sin\alpha)|^2 \\
&= |2\cos(2\pi x/p)|^2 \\
&= 2\{1 + \cos(4\pi x/p3)\}
\end{aligned} \quad (1)$$

As is obvious when looking at equation (1), information of various types is included in light intensity I of the interference fringe formed in movement scale 24. For example, exp(jkL) in equation (1) above includes information on the optical path length, exp(-j2πΔx/p) includes information related to the positional shift in the X-axis direction of the incident position of each diffracted light on movement scale 24, and exp(-jkx*sin α) includes information related to the angle of the diffracted light.

The most important point that equation (1) indicates is that the interference fringe made on movement scale 24 does not move in the X-axis direction, even if the positional relation between the scales in the Z-axis direction changes when the laser beam is perpendicularly incident on index scale 20.

Figure 3:
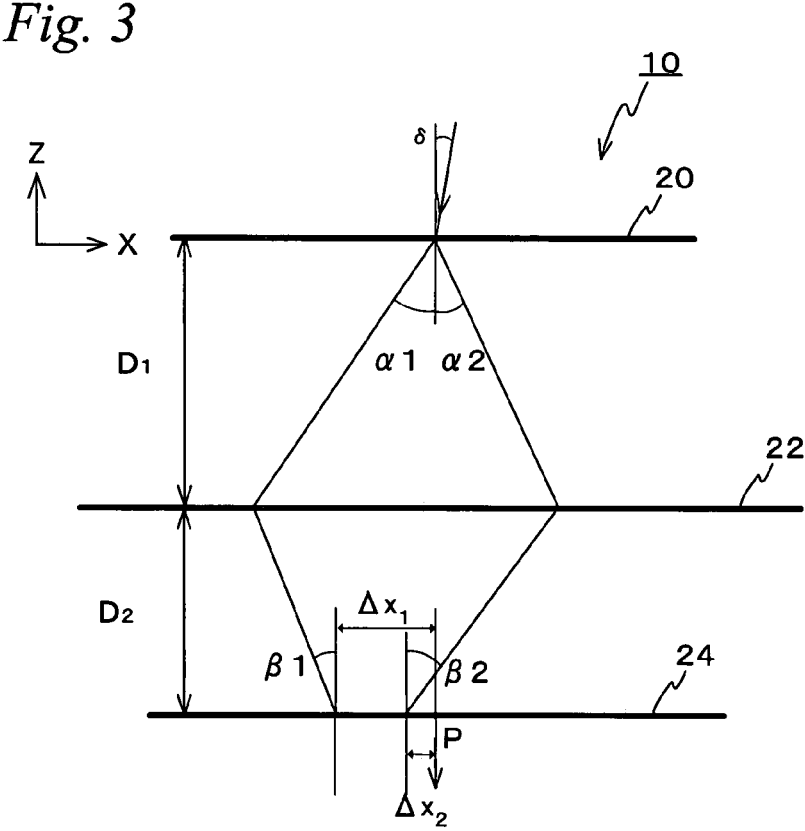
FIG. 3 is a view showing a modulation (No. 2) of the encoder in FIG. 1.

Meanwhile, FIG. 3 shows a case when the laser beam is obliquely incident (angle δ) on index scale 20 by vibration mirror 14. In the case the angle of the $-1^{st}$ order diffracted light is α1 (α1>0) and the angle of the $+1^{st}$ order diffracted light is α2 (α2<0), after these diffracted lights are diffracted in index scale 22 (outgoing angle β1<0, β2>0), these lights are incident on movement scale 24 where a $\pm 1^{st}$ order diffraction occurs again and the diffracted lights are emitted at angles γ1 and γ2. In this case, the relation between angles 1, β1, and γ1 can be defined as in the equations below.

<Relation Between Angles α1, β1, and γ1 of the $-1^{st}$ Order Diffracted Light> sin α1=λ/P1+sin δ=λ/p+sin δ sin β1=-λ/P2+sin α1=-λ/p+sin δ; β1<0 sin γ1=λ/P3+sin β1=sin δ

<Relation Between Angles α2, β2, and γ2 of the $+1^{st}$ Order Diffracted Light> sin α2=-λ/P1+sin δ=-λ/p+sin δ; α2=β1<0 sin β2=λ/P2+sin α2=λ/p+sin δ; β2=α1 sin γ2=-λ/P3+sin β2=sin δ

From these relations, γ1=γ2=δ can be acquired.

As is shown in FIG. 3, the incident position of the $\pm 1^{st}$ order diffracted lights when the laser beam is incident on movement scale 24 shifts from a point P by $\Delta x_1$ and $\Delta x_2$. $\Delta x_1$ and $\Delta x_2$ can be expressed as in the following equations.

Figure 4:
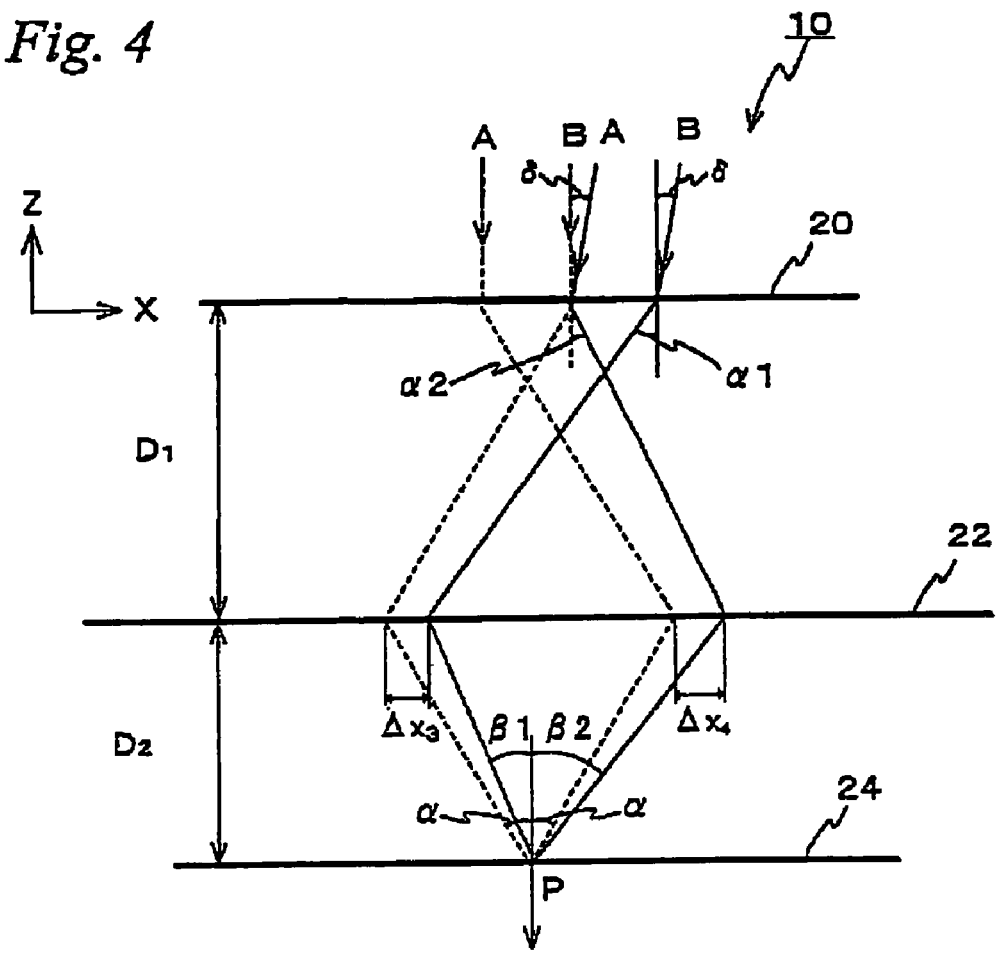
FIG. 4 is a different optical path view of the encoder in FIG. 1.

$\Delta x_1 = D_1*\tan \alpha 1 - D_2*\tan|\beta 1|$ $\Delta x_2 = D_2*\tan \beta 2 - D_1*\tan|\alpha 2|$ $\Delta x_1 + \Delta x_2 = D_1*(\tan \alpha 1 - \tan|\alpha 2|) + D_2*(\tan \beta 2 - \tan|\beta 1|)$ $\Delta x_1 - \Delta x_2 = D_1*(\tan \alpha 1 + \tan|\alpha 2|) - D_2*(\tan \beta 2 + \tan|\beta 1|)$ The optical path of the diffracted light in encoder 10 can also be expressed as in FIG. 4. FIG. 4 shows an optical path of the diffracted light incident on point P on movement scale 24. More specifically, FIG. 4 shows the optical path in the case when the laser beam is perpendicularly incident on movement scale 24 in a dotted line, and the optical path in the case when the laser beam is incident on movement scale 24 at an incident angle δ in a solid line. In these two cases, when the shift of the incident position of the $-1^{st}$ order diffracted light on index scale 22 is $\Delta x_3$ and the shift of the incident position of the $+1^{st}$ order diffracted light on index scale 22 is $\Delta x_4$, then $\Delta x_3$ and $\Delta x_4$ can be expressed as in the following equation.

$\Delta x_3 = D_2*(\tan \alpha - \tan|\beta 1|)$ $\Delta x_4 = D_2*(\tan \beta 2 - \tan \alpha)$ In the case the laser beam is obliquely incident on index scale 20, the optical path length of the $-1^{st}$ order diffracted light is $D_1/\cos \alpha 1 + D_2/\cos \beta 1$ while the optical path length of the $+1^{st}$ order diffracted light is $D_1/\cos \alpha 2 + D_2/\cos \beta 1$. When the irradiation change of index scale 22 is also taken into consideration, light intensity I of the interference light on movement scale 24 can be computed as follows.

Equation 2

$$\begin{aligned}
I &= |\exp(jkx \cdot \sin\beta 1 + jkD_1/\cos\alpha 1 + jkD_2/\cos\beta 1 - \\
&\quad 2\pi\Delta x1/p + 4\pi\Delta x3/p + jk\Delta x1 \cdot \sin\delta) + \\
&\quad \exp(jkx \cdot \sin\beta 2 + jkD_1/\cos\alpha 2 + jkD_2/\cos\beta 2 + \\
&\quad 2\pi\Delta x2/p - 4\pi\Delta x4/p + jk\Delta x2 \cdot \sin\delta)|^2 \\
&= 2[1 + \cos\{kx \cdot (\sin\beta 1 - \sin\beta 2)\} + \\
&\quad kD_1(1/\cos\alpha 1 - 1/\cos\alpha 2) + kD_2(1/\cos\beta 1 - 1/\cos\beta 2) - \\
&\quad 2\pi/p \cdot (\Delta x_1 + \Delta x_2) + 4\pi/p \cdot (\Delta x_3 + \Delta x_4) + \\
&\quad k\sin\delta \cdot (\Delta x_1 - \Delta x_2)\}] \\
&= 2[1 + \cos\{4\pi x/p + 2\pi D_1/\lambda \cdot (1/\cos\alpha 1 - 1/\cos\alpha 2) + \\
&\quad 2\pi D_2/\lambda \cdot (1/\cos\beta 1 - 1/\cos\beta 2) - 2\pi D_1/p \cdot \\
&\quad (\tan\alpha 1 - \tan|\alpha 2|) + 2\pi D_2/p \cdot (\tan\beta 2 - \tan|\beta 1|) + \\
&\quad 2\pi D_1 \sin\delta/\lambda \cdot (\tan\alpha 1 + \tan|\alpha 2|) - 2\pi D_2 \sin\delta/\lambda \cdot \\
&\quad (\tan\beta 2 + \tan|\beta 1|)\}] \\
&= 2[1 + \cos\{4\pi x/p + 2\pi(D_1 - D_2)/\lambda \cdot \\
&\quad (1/\cos\alpha 1 - 1/\cos\alpha 2) - 2\pi(D_1 - D_2)/p \cdot \\
&\quad (\tan\alpha 1 - \tan|\alpha 2|) + 2\pi(D_1 - D_2)\sin\delta/\lambda \cdot \\
&\quad (\tan\alpha 1 + \tan|\alpha 2|)\}]
\end{aligned} \quad (2)$$

In the second term to the fourth term of an independent variable of the cos function in equation (2) above, the second term and the third term negate each other so that the values substantially become zero, and in the end only the fourth term $(2\pi(D_1-D_2)\sin \delta/\lambda*(\tan \alpha 1+\tan|\alpha 2|)$ remains. The value of the fourth term changes according to the change of the incident angle δ, therefore, when the incident angle δ changes, the interference fringe on movement scale 24 moves in the X-axis direction. Accordingly, modulation of the light intensity signal corresponding to the photodetection results of photodetection element 26 is achieved.

In the pitch relation of P1=P3=p and P2=p/2, if $D_1=D_2$, then the fourth term also becomes zero and the light intensity signal cannot be modulated, therefore, it is necessary to be $D_1 \neq D_2$. More specifically, if $D_1$ and $D_2$ are different, then, the degree of modulation changes so that the distance of the scale has to be controlled by for example, keeping the distance constant. Further, conversely, it is possible to control the degree of modulation by the setting of $D_1$ and $D_2$.

As is described above, the degree of modulation of the light intensity signal corresponding to the photodetection results of photodetection element 26 is decided by the pitch of the diffraction grating (diffraction angle: tan α), the incident angle of the laser beam (sin δ), and the difference in distance on movement scale 24 ($D_1-D_2$).

Next, in the case of (2), that is, when P1≠P2≠P3; 1/P3=1/P2−1/P1 will be described. For example, in the case P1=2.4 μm, P2=1.5 μm, and P3=4 μm, then, the angles α, β, and γ can be defined as in the equations below.

$$\sin \alpha = \lambda/P1$$

$$\sin \beta = \lambda/P2 - \sin \alpha = \lambda/P2 - \lambda/P1$$

$$\sin \gamma = \lambda/P3 - \sin \beta = \lambda/P3 - \lambda/P2 + \lambda/P1 = 0$$

(∵ 1/P3=1/P2−1/P1)

Furthermore, Δx (refer to FIG. 2) can be expressed as in the following equation.

$$\Delta x = D_1 * \tan \alpha - D_2 * \tan \beta$$

In the case the laser beam is perpendicularly incident on index scale 20, the optical length of the $+1^{st}$ order diffracted light and the $-1^{st}$ order diffracted light generated in index scale 20 is the same. When the optical path length is expressed as L, then $L = D_1/\cos \alpha + D_2/\cos \beta$, and light intensity I of the interference fringe on movement scale 24 can be computed. The shift amount of index scale 22 is omitted since the shift amount is regarded relative.

Equation 3

$$\begin{aligned} I &= |\exp(jkL - j2\pi\Delta x/p - jkx\cdot\sin\beta) + \\ &\quad \exp(jkL - j2\pi\Delta x/p + jkx\cdot\sin\beta)|^2 \\ &= |2\cos(kx\cdot\sin\beta)|^2 \\ &= 2\{1 + \cos(4\pi x/p3)\} \end{aligned} \quad (3)$$

Meanwhile, as is shown in FIG. 3, in the case the laser beam is obliquely incident (angle δ) on index scale 20, the angle of the $-1^{st}$ order diffracted light is to be α1 (α1>0) and the angle of the $+1^{st}$ order diffracted light is to be α2 (α2<0). After these diffracted lights are diffracted in index scale 22 (outgoing angle β1<0, β2>0), these lights are incident on movement scale 24 where a $\pm 1^{st}$ order diffraction occurs again and the diffracted lights are emitted at angles γ1 and γ2. In this case, the relation between angles α1, β1, and γ1 can be defined as in the equations below.

<Relation Between Angles α1, β1, and γ1 of the $-1^{st}$ Order Diffracted Light>

$$\sin \alpha 1 = \lambda/P1 + \sin \delta$$

$$\sin \beta 1 = -\lambda/P2 + \sin \alpha 1 = -\lambda/P2 + \lambda/P1 + \sin \delta; \beta 1 < 0$$

$$\sin \gamma 1 = \lambda/P3 + \sin \beta 1 = \sin \delta$$

<Relation Between Angles α2, β2, and γ2 of the $+1^{st}$ Order Diffracted Light>

$$\sin \alpha 2 = -\lambda/P1 + \sin \delta; \alpha 2 < 0$$

$$\sin \beta 2 = \lambda/P2 + \sin \alpha 2 = \lambda/P2 - \lambda/P1 + \sin \delta$$

$$\sin \gamma 2 = -\lambda/P3 + \sin \beta 2 = \sin \delta$$

From these results, γ1=γ2=δ can be acquired.

Further, $\Delta x_1$ and $\Delta x_2$ (refer to FIG. 3) are expressed as in the equations below.

$$\Delta x_1 = D_1 * \tan \alpha 1 - D_2 * \tan|\beta 1|$$

$$\Delta x_2 = D_2 * \tan \beta 2 - D_1 * \tan|\alpha 2|$$

$$\Delta x_1 + \Delta x_2 = D_1 * (\tan \alpha 1 - \tan|\alpha 2|) + D_2 * (\tan \beta 2 - \tan|\beta 1|)$$

$$\Delta x_1 - \Delta x_2 = D_1 * (\tan \alpha 1 + \tan|\alpha 2|) - D_2 * (\tan \beta 2 + \tan|\beta 1|)$$

then $\Delta x_3$ and $\Delta x_4$ can be expressed as in the following equation.

$$\Delta x_3 = D_2 * (\tan \alpha - \tan|\beta 1|)$$

$$\Delta x_4 = D_2 * (\tan \beta 2 - \tan \alpha)$$

In the case the laser beam is obliquely incident on index scale 20, the optical path length of the $-1^{st}$ order diffracted light is $D_1/\cos \alpha 1 + D_2/\cos \beta 1$ while the optical path length of the $+1^{st}$ order diffracted light is $D_1/\cos \alpha 2 + D_2/\cos \beta 1$. When the irradiation change of index scale 22 is also taken into consideration, light intensity I of the interference light on movement scale 24 can be computed as follows.

Equation 4

$$\begin{aligned} I &= |\exp(jkx\cdot\sin\beta 1 + jkD_1/\cos\alpha 1 + jkD_2/\cos\beta 1 - \\ &\quad 2\pi\Delta x1/p1 + 2\pi\Delta x3/p2 + jk\Delta x1\cdot\sin\delta) + \\ &\quad \exp(jkx\cdot\sin\beta 2 + jkD_1/\cos\alpha 2 + jkD_2/\cos\beta 2 + \\ &\quad 2\pi\Delta x2/p1 - 2\pi\Delta x4/p2 + jk\Delta x2\cdot\sin\delta) \\ &= 2[1 + \cos\{kx\cdot(\sin\beta 1 - \sin\beta 2)\} + kD_1(1/\cos\alpha 1 - \\ &\quad 1/\cos\alpha 2) + kD_2(1/\cos\beta 1 - 1/\cos\beta 2) - \\ &\quad 2\pi/p1\cdot(\Delta x_1 + \Delta x_2) + 2\pi/p2\cdot(\Delta x_3 + \Delta x_4) + k\sin\delta\cdot \\ &\quad (\Delta x_1 - \Delta x_2)\}] \\ &= 2[1 + \cos\{4\pi x/p + 2\pi D_1/\lambda\cdot(1/\cos\alpha 1 - 1/\cos\alpha 2) + \\ &\quad 2\pi D_2/\lambda\cdot(1/\cos\beta 1 - 1/\cos\beta 2) - 2\pi D_1/p1\cdot(\tan\alpha 1 - \\ &\quad \tan|\alpha 2|) - 2\pi D_2/p1\cdot(\tan\beta 2 - \tan|\beta 1|) + 2\pi D_2/p2\cdot \\ &\quad (\tan\beta 2 - \tan|\beta 1|) + 2\pi D_1\sin\delta/\lambda\cdot(\tan\alpha 1 + \tan|\alpha 2|) - \\ &\quad 2\pi D_2\sin\delta/\lambda\cdot(\tan\beta 2 + \tan|\beta 1|)\}] \end{aligned} \quad (4)$$

In the second term to the eighth term of an independent variable of the cos function in equation (4) above, the second term to the sixth term negate one another so that the values substantially become zero, and in the end only the seventh and eighth terms remain. The values of the seventh and eighth terms change according to the change of the incident angle δ, therefore, when angle δ changes, the interference fringe on movement scale 24 moves in the X-axis direction. Accordingly, modulation of the light intensity signal corresponding to the photodetection results of photodetection element 26 is achieved.

In this case as well, the degree of modulation of the light intensity signal corresponding to the photodetection results of photodetection element 26 is decided by the pitch of the diffraction grating (diffraction angle: tan α1, tan|α2|, tan β1, tan|β2|), the incident angle of the laser beam (sin δ), and the difference in distance of the scale. Also in this case, when $D_1=D_2$, then the seventh and eighth terms negate each other and become substantially zero and modulation of the light intensity signal becomes difficult. Therefore, as is described above, it is necessary to be $D_1 \neq D_2$. That is, $D_1$ and $D_2$ should be set so that an optimal degree of modulation can be acquired according to each of the pitches P1, P2, and P3.

Figure 5:
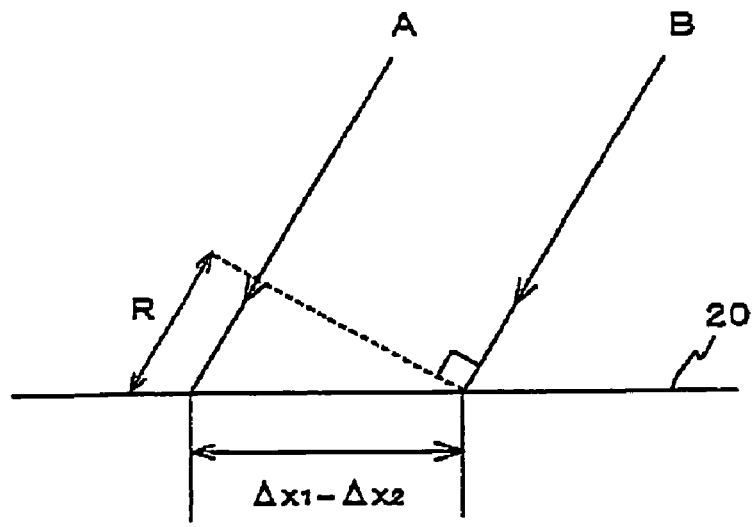
FIG. 5 is a view for describing an optical path difference between light A and light B.

As is shown in FIG. 4, the diffracted light incident on one point on movement scale 24 is light emitted from two different points on index scale 20. In FIG. 4, these two lights are indicated as light A and light B. More specifically, the distance between the incident position of light A and light B on index scale 20 turns out to be substantially the same as the distance between the incident position of the two lights in FIG. 3. As is obvious from equation (2) above or the like, the distance between lights A and B is proportional to the distance difference of the scales ($D_1-D_2$). When comparing light A with light B, the optical path length of light A is longer than the optical length of light B according to incident angle δ of the laser beam, which causes an optical path length difference R as is shown in FIG. 5, therefore, it can also be assumed that a phase difference will occur between the diffracted lights entering photodetection element 26.

More specifically, by the phase difference occurring between light A and light B, the intensity of photoelectric conversion signals output from photodetection element 26 changes. That is, the phase difference between light A and light B caused by the periodical change of the incident angle of the incident lights is modulated, and the interference signal is modulated.

In the case the angular frequency of the rotation vibration of vibration mirror 14 is expressed as ω and the amplitude is expressed as ε (half amplitude ε/2), then the signal corresponding to the rotation vibration of vibration mirror 14 can be expressed as (ε/2)sin ωt. In the description below, modulation degree $2d=2\pi\epsilon/p$ is defined as an index for showing the width of amplitude ε, with grating pitch p of index scale 20 and movement scale 24 used as a reference.

The photoelectric conversion signal output from photodetection element 26 is sent to a detection unit (not shown). The detection unit demodulates the photoelectric conversion signal and detects the positional information of movement scale 24. The detection unit extracts the $0^{th}$ order component (direct current component), the $1^{st}$ order component, the $2^{nd}$ order component, the $3^{rd}$ order component, and the $4^{th}$ order component corresponding to the signal of rotation vibration of vibration mirror 14.

The signal waveform of the photoelectric conversion signal can be expanded into a Bessel series regarding time t. This Bessel expansion coefficient $J_n$ (n=1, 2, 3, . . . ) is a constant value as long as modulation degree $2d$ is constant. The $n^{th}$ order component $I_n$ (n=1, 2, 3, and 4) extracted in the detection unit can be expressed as in the following equations.

$$I_0=1+J_0(2d)*\cos(4\pi x/p) \quad (5)$$

$$I_1=2J_1(2d)*\sin(4\pi x/p) \quad (6)$$

$$I_2=2J_2(2d)*\cos(4\pi x/p) \quad (7)$$

$$I_3=2J_3(2d)*\sin(4\pi x/p) \quad (8)$$

$$I_4=2J_4(2d)*\cos(4\pi x/p) \quad (9)$$

As is obvious from equations (5) to (9) above, in the detection unit, when a specific frequency component (e.g. the $1^{st}$ order component $I_1$) related to temporal change of the photoelectric conversion signal and another a specific frequency component (e.g. the $2^{nd}$ order component $I_2$) are extracted, a sine signal and a cosine signal serving as positional information of movement scale 24 can be obtained. These two signals can be the output of encoder 10.

Because the sine signal and cosine signal described above are signals that can be accurately obtained under the premise that modulation degree $2d$ is constant, encoder 10 is further equipped with a control mechanism that controls the modulation degree at a constant level.

A modulation degree control circuit takes in the $1^{st}$ order component $I_1$, the $2^{nd}$ order component $I_2$, the $3^{rd}$ order component $I_3$, and the $4^{th}$ order component $I_4$ that have been extracted, and monitors modulation degree $2d$ based on the components. Modulation degree $2d$ are expressed by $I_1/I_3$ and $I_2/I_4$. The $1^{st}$ order component $I_1$ to the $4^{th}$ order component $I_4$ include the sine function and cosine function, therefore, the value that has a function value which is not in the proximity of zero is selected as the modulation degree at this point. The modulation degree control circuit controls drive unit 16 in the direction so that the modulation degree that has been monitored nears the target value, which has been described earlier in the description. Accordingly, modulation degree $2d$ maintains a constant level.

Figure 6:
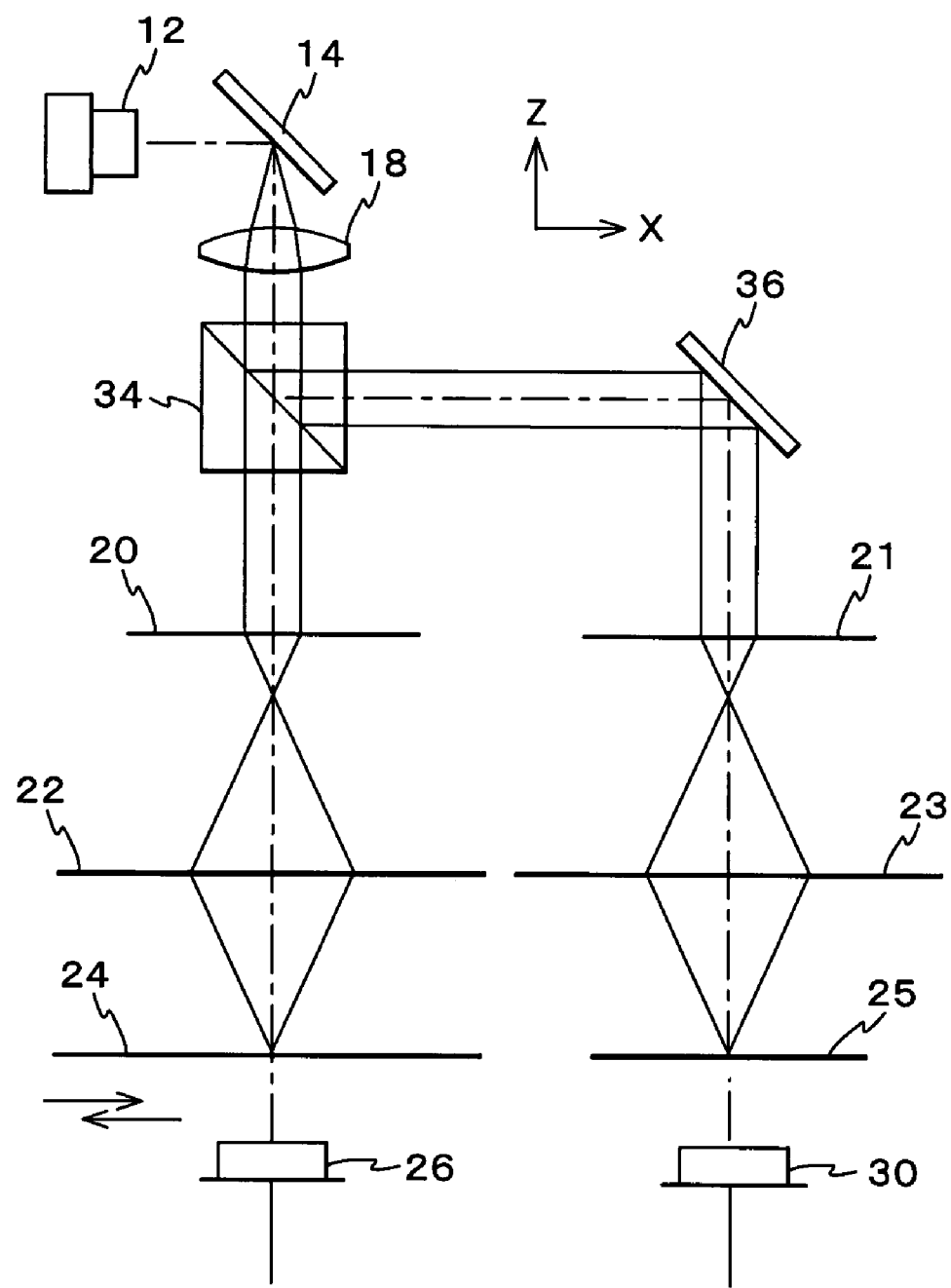
FIG. 6 is a view schematically showing an entire configuration of an optical system of an encoder.

FIG. 6 shows a schematic configuration of an optical system whose encoder 10 is partly improved. As is shown in FIG. 6, in addition to the component parts shown in FIG. 1, encoder 10 is further equipped with index scales 21 and 23, a beam splitter 34, a reflection mirror 36, a reference scale 25, and a photodetection element 30. Index scale 21 is the same type of scale as index scale 20 (the grating pitch is also the same), and index scale 23 is the same type of scale as index scale 22 (the grating pitch is also the same). Further, reference scale 25 is a transmissive type phase grating consisting of a plate on which a diffraction grating with a period direction in the X-axis direction is formed as in movement scale 24, however, while movement scale can be moved in the X-axis direction, reference scale 25 is fixed, and the positional relation between index scales 21, 23 and reference scale 25 is constant at all times.

The light reflected off beam splitter 34 is bent at reflection mirror 36, and is incident on index scale 21. The ±$1^{st}$ order diffracted lights generated in index scale 21 are further diffracted in index scale 23, and then are incident on reference scale 25.

As is described above, reference scale 25 is fixed to movement scale 24, therefore, the photoelectric conversion signal output from photodetection element 30 changes according only to the change in the incident angle of the laser beam. Accordingly, it becomes possible to detect information related to the change in the incident angle of the laser beam from the photoelectric conversion signal.

In encoder 10, the vibration center of vibration mirror 14 may drift depending on the temperature of the atmosphere or the change in humidity. In this case, since the signal level of the photoelectric conversion signal of photodetection element 30 changes, the detection unit detects the drift amount of the vibration center of vibration mirror 14 based on such change in the signal level.

In this case, from the photoelectric conversion signal output from photodetection element 26 and the photoelectric conversion signal output from photodetection element 30, the detection unit extracts the $1^{st}$ order component $I_1$, the $2^{nd}$ order component $I_2$, the $3^{rd}$ order component $I_3$, and the $4^{th}$ order component $I_4$ described above, and outputs positional information of movement scale 24 (to be expressed as positional information A) and positional information of reference scale 25 (to be expressed as positional information B). Then, by subtracting the detection results of the photoelectric conversion signal by photodetection element 30 or in other words positional information B, from the detection results of the photoelectric conversion signal by photodetection element 26, or in other words positional information A, the signal for detecting positional information of the encoder whose influence of the drift of the vibration center of vibration mirror 14 has been removed (the final positional information of movement scale 24, or positional information which is positional information A of movement scale 24 that has been corrected using positional information B of reference scale 25) can be obtained.

(positional information A−positional information B)=(signal for detecting positional information of the encoder)

Incidentally, a conversion factor k for obtaining the drift component, which is in a linear relation with the photoelectric conversion signal output from photodetection element 30 can be multiplied to positional information B.

Furthermore, the photoelectric conversion signal output from photodetection element 30 is also used for detection of movement scale 24 in the Z-axis direction. The modulation degree control circuit described above monitors modulation degree 2d based on the photoelectric conversion signal output from photodetection element 26 (a first modulation degree), whereas at the same time, the modulation degree control circuit also monitors modulation degree 2d based on the photoelectric conversion signal output from photodetection element 30 (a second modulation degree).

The cause of the change in the second modulation degree obtained from the photodetection results of the laser beam via reference scale 25 is only the change in the vibration state of the incident angle of the laser beam from light source 12, whereas the change in the first modulation degree obtained from the photodetection results of the light via movement scale 24 is caused by the drift of movement scale 24 in the Z-axis direction in addition to the change in the vibration state of the incident angle of the laser beam from light source 12. Accordingly, in the case when both the first modulation degree and the second modulation degree change, it can be assumed that the vibration state of the incident angle of the laser beam has changed, and in the case only the first modulation degree changes, it can be assumed that movement scale 24 has drifted in the Z-axis direction.

From the description above, the difference between the first modulation degree and the second modulation degree is to be expressed by the drift of movement scale 24 in the Z-axis direction. The difference, proportion or the like of the first modulation degree and the second modulation degree and the drift of movement scale 24 in the Z-axis direction can be assumed to be in a linear relation in a predetermined range.

For example, information related to the drift in the Z direction can be measured, for example, by detecting the amplitude ratio of a plurality of harmonic components. Photoelectric conversion signal from photodetection element 26 (hereinafter expressed as $Z_{OUT}$) can be expressed in a form of a Bessel function as is shown in equation (10) below. In the equation below, $J_n$ (n=1, 2, 3 . . . ) is a Bessel expansion coefficient and x indicates the positional information of movement scale 22, d indicates modulation efficiency, and ω indicates modulation frequency of vibration mirror 14.

$$Z_{OUT} = \cos[d * \sin(\omega t) + x] \quad (10)$$
$$= \cos[d * \sin(\omega t)] * \cos(x) - \sin[d * \sin(\omega t)] * \sin(x)$$
$$= J_0(d) * \cos(x) - 2J_1(d) * \sin(x) * \sin(\omega t) + 2J_2(d) *$$
$$\cos(x) * \cos(2\omega t) - 2J_3(d) * \sin(x) * \sin(3\omega t) +$$
$$2J_4(d) * \cos(x) * \cos(4\omega t)$$

As it can be seen from equation (10), fundamental wave component A1, the second harmonic wave component A2, the third harmonic wave component A3, and the fourth harmonic wave component A4 of photoelectric conversion signal $Z_{OUT}$ are respectively expressed as in equations (11) to (14) below, and the amplitude of an odd number order harmonic wave component is a function of sin(x) while the amplitude of an even number order harmonic wave component is a of function cos (x).

$$A1 = -2J_1(d) * \sin(x) * \sin(\omega t) \quad (11)$$

$$A2 = +2J_2(d) * \cos(x) * \cos(2\omega t) \quad (12)$$

$$A3 = -2J_3(d) * \sin(x) * \sin(3\omega t) \quad (13)$$

$$A4 = +2J_4(d) * \cos(x) * \cos(4\omega t) \quad (14)$$

Then, when calculations of A1/A3 and A2/A4 are performed, A1/A3 and A2/A4 become functions of modulation efficiency d, as is shown in equations (15) and (16) below.

$$A1/A3 = J_1(d)/J_3(d) \quad (15)$$

$$A2/A4 = J_2(d)/J_4(d) \quad (16)$$

Because the functions shown in equations (15) and (16) above are amplitude ratios of the harmonic wave components, modulation efficiency d can be obtained by monitoring the calculation results of $J_1(d)/J_3(d)$ or $J_2(d)/J_4(d)$. Also, because modulation efficiency d is proportional to amplitude which changes according to the change of position of movement scale 24 in the Z-axis direction, by monitoring modulation efficiency d, measurement of movement scale 24 in the Z-axis direction becomes possible. However, in order to accurately perform measurement of movement scale 24 in the Z-axis direction, measurement of movement scale 24 in the Z-axis direction has to be performed from calculation results of $J_1(d)/J_3(d)$ when the condition $|\sin(x)| \geq 1/\sqrt{2}$ is satisfied, and further from calculation results of $J_2(d)/J_4(d)$ when the condition $|\cos(x)| \geq 1/\sqrt{2}$ is satisfied.

The modulation degree control circuit monitors the calculation results of $J_1(d)/J_3(d)$ or $J_2(d)/J_4(d)$ and performs measurement of movement scale 24 in the Z-axis direction, and outputs information related to the drift of movement scale 24 in the Z-axis direction (in this case, the drift amount) as a detection signal.

Further, the movement direction (measurement direction) of movement scale 24 and the proceeding direction of the laser beam are almost perpendicular, however, there actually is a slight inclination. In such a case, the drift of movement scale 24 in the Z-axis direction becomes a cause of measurement error (offset component) in the positional information of movement scale 24.

Accordingly, in the detection unit, the offset component of movement scale 24 is computed from the drift amount of the movement scale 24 in the Z-axis direction, and it becomes possible to compute the final positional information of movement scale 24 by subtracting the offset component from the positional information of movement scale 24.

The configuration of the encoder is not limited to the one shown in FIG. 6, and a configuration in which a beam splitter is placed between index scale 22 and movement scale 24 and the divided light is incident on reference scale 25 can also be employed.

As is described in detail so far, according to the present invention, the lights outgoing from different positions of index scale 20 are incident on the same position on movement scale 24 and interfere with each other. Therefore, when the incident angle of the laser beams to index scale 20 is changed, the variation range of the phase difference of the lights outgoing from different position of index scale 20 becomes larger, which improves the modulation efficiency of the interference light formed in movement scale 24 when compared with the case when the lights outgoing from the same position of index scale 20 are incident on the same position on movement scale 24.

Further, according to the preset embodiment, index scale 20 and movement scale 24 are both diffraction gratings, however, instead of index scale 20, a beam splitter can be employed.

Figure 7:
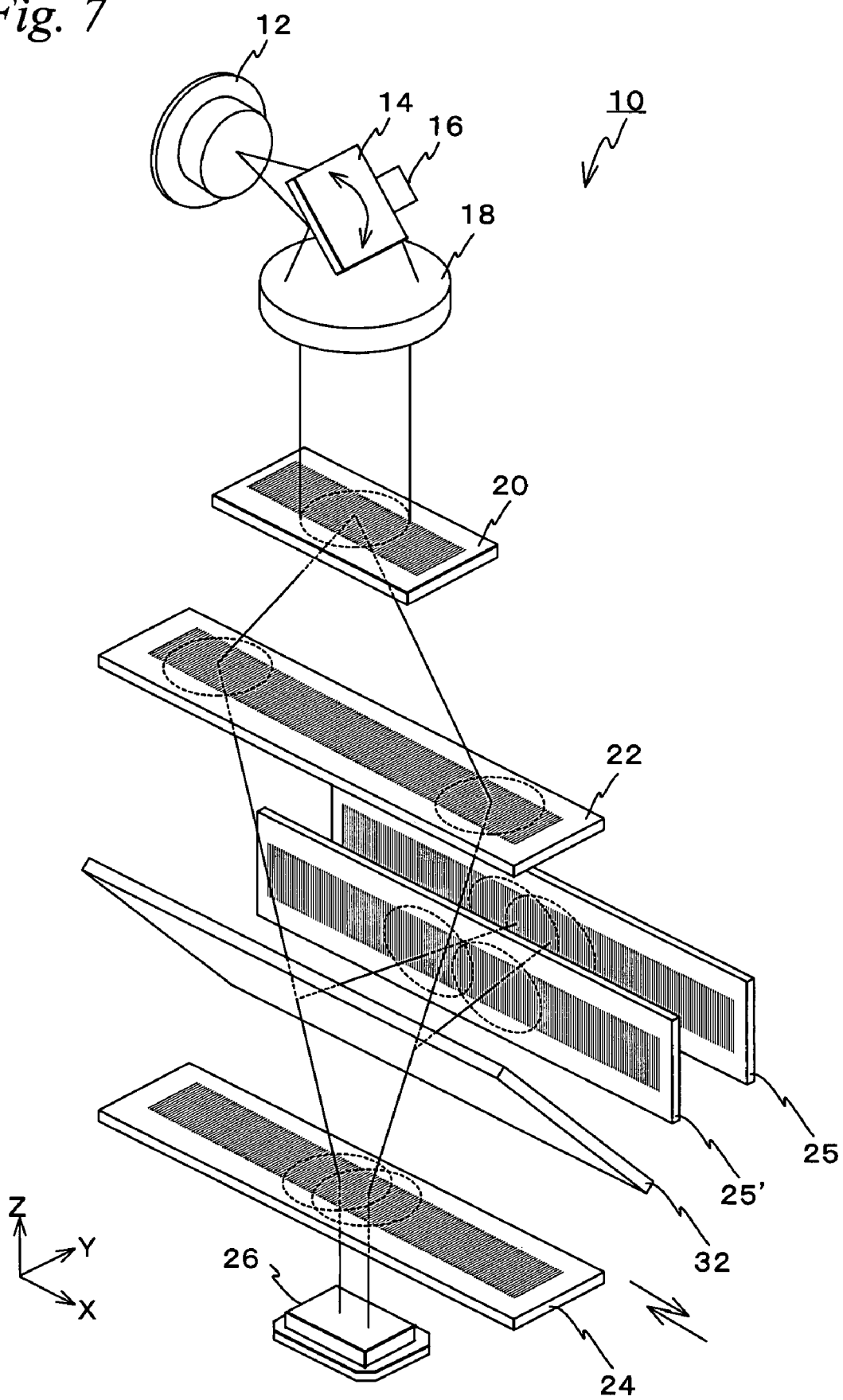
FIG. 7 is a view showing an encoder equipped with two reference scales.
Figure 8:
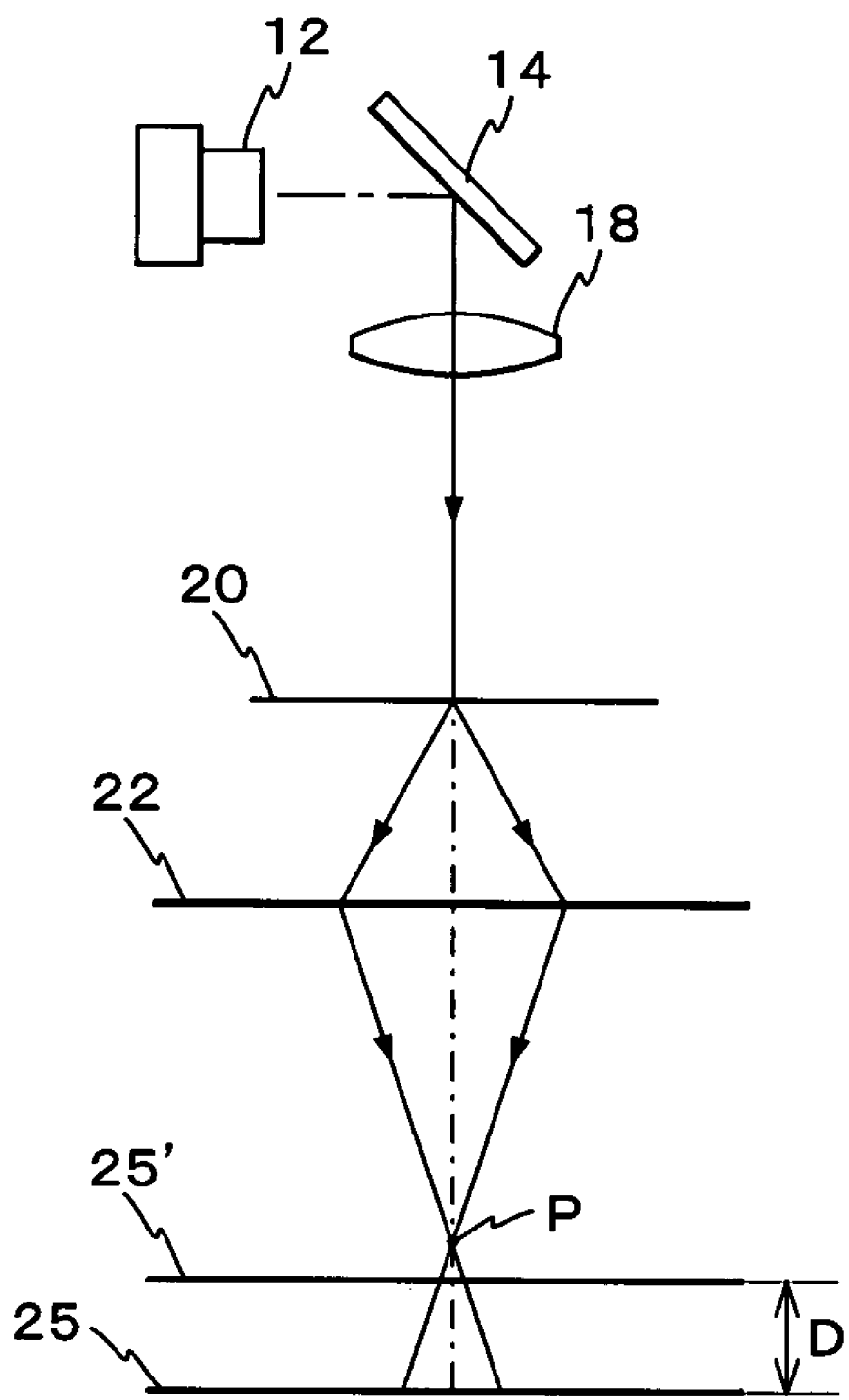
FIG. 8 is an optical layout of the encoder in FIG. 7.

Further, the reference scale can be divided into two sections, and by placing the sections so that they face each other in the proceeding direction of the laser beam, the drift amount can be measured with good precision. For example, as is shown in FIG. 7, a part of the laser beam that has transmitted index scale 22 is branched to the +Y direction, and a first reference scale 25' and a second reference scale 25 are placed on the optical path. As is shown in FIG. 8, which is a view of an optical layout of encoder 10, the first reference scale 25' and the second reference scale 25 are placed at positions shifted by a predetermined distance from a vibration center point P where the ± first-order diffracted lights emitted from index scale 22 completely overlaps, spaced apart from each other at a distance D.

In this case, when the modulation degree of the interference light from the first reference scale 25' is indicated as A1, the modulation degree of the interference light from the second reference scale 25 is indicated as A2, and the modulation degree of the interference light from movement scale 24 is indicated as A, then, displacement Z of movement scale 24 in the Z-axis direction can be expressed as $(A/(A2-A1))*D$. This shows that even in the case vibration center point P of the diffracted light from index scale 22 has moved, or to be more specific, in the case vibration center point P has moved so that it is on the first reference scale 25' or the second reference scale 25, displacement Z of movement scale 24 in the Z-axis direction can be measured in a stable manner. Accordingly, it becomes possible to improve the measurement stability when compared with the case when only one reference scale is used.

Further, encoder 10 related to the embodiment is further equipped with index scale 22 that guides lights A and B to movement scale 24. Incidentally, instead of index scale 22, a reflection mirror can also be used.

Figure 9:
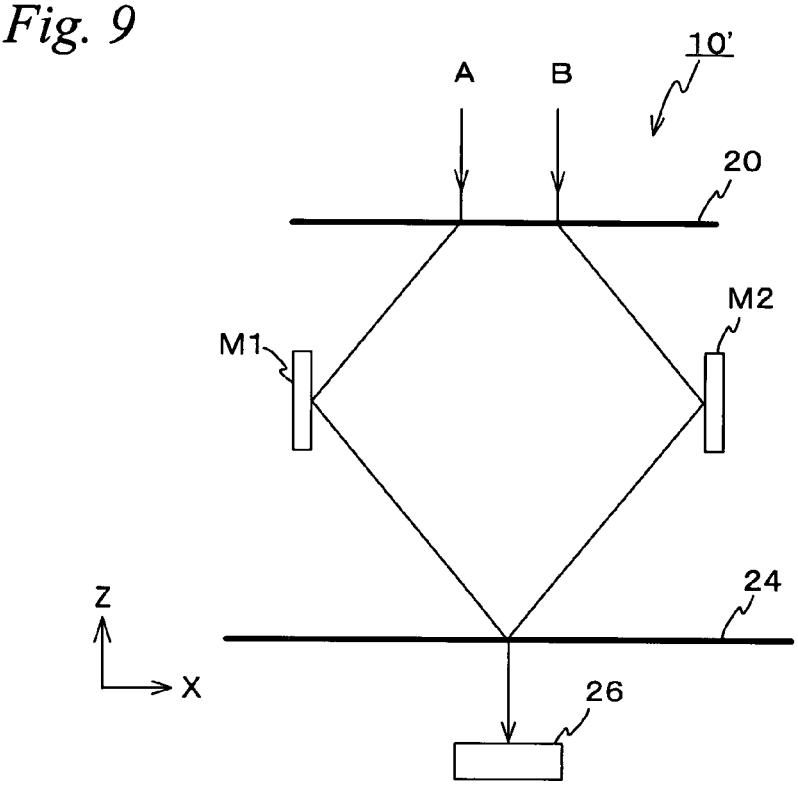
FIG. 9 is a view showing a modulation (No. 1) of an encoder that employs a reflection mirror.
Figure 10:
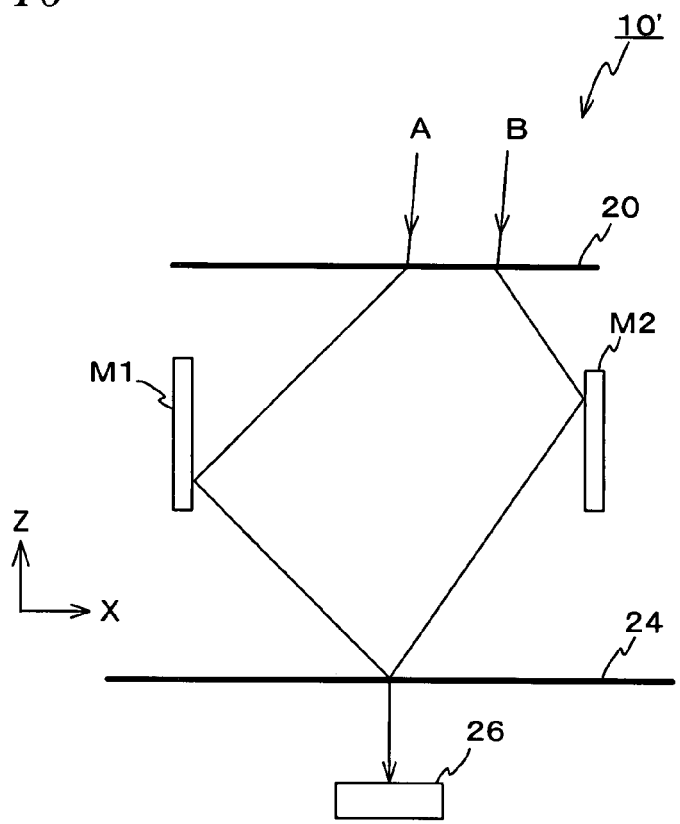
FIG. 10 is a view showing a modulation (No. 2) of an encoder that employs a reflection mirror.

FIGS. 9 and 10 show an optical path of a laser beam in an encoder 10' that employs reflection mirrors M1 and M2. As is shown in FIG. 9, in the case the laser beam is incident almost perpendicularly, an optical path difference occurs between optical paths A and B that are incident on the same position on movement scale 24, however, in the case the laser beam is obliquely incident as is shown in FIG. 10, an optical path difference occurs between optical paths A and B and the photoelectric conversion signal output from photodetection element 26 or the like is modulated as in the case of encoder 10.

In FIGS. 9 and 10, mirrors are used instead of index scale 22, therefore, the positive and negative directions of modulation (the movement direction of the interference fringe on movement scale 24) will be the opposite of encoder 10 related to the embodiment described above.

The pitch of index scale 20 and movement scale 24 does not necessarily have to be the same, however, because the outgoing direction of the diffracted lights generated in movement scale 24 is decided according to wavelength λ of the light and the grating pitch, the arrangement relation between optical members, which are disposed in between index scale 20 and movement scale 24, and photodetection element 26 or the like will be appropriately decided depending on the grating pitch of these diffraction gratings. For example, according to the relation between the grating pitches of index scale 20 and movement scale 24 and modulation efficiency, the reflection surfaces of mirror M1 and mirror M2 can be inclined at optional angles according to the grating pitch ratio, instead of being arranged in parallel with each other.

Furthermore, according to the embodiment, in addition to the photodetection results by photodetection element 26 via index scales 20 and 22 and movement scale 24 that are relatively displaced with respect to beam splitter 34, when the photodetection results by photodetection sensor 30 of index scales 21 and 23 and reference scale 25 are used, it also becomes possible to compute information related to positional shift of movement scale 24 in the Z-axis direction, besides positional information on movement scale 24 related to the measurement direction.

More specifically, the detection unit computes information related to positional shift of movement scale 24 in the Z-axis direction, based on the first modulation degree of the laser beam obtained from the photodetection results of photodetection element 26 and the second modulation degree of the laser beam obtained from the photodetection results of photodetection element 30. This computation allows the detection of whether the drift in the Z-axis direction, which is a positional shift in a direction different from its original measurement direction, has occurred or not.

Further, according to the embodiment, positional information of movement scale 24 in the X-axis direction obtained from the photodetection results of the photodetection system is corrected based on the computation results of the detection unit, and positional information of movement scale 24 in the X-axis direction is detected with high precision.

In encoder 10 related to the embodiment, the drift amount of movement scale 24 in the Z-axis direction was obtained using the modulation degree that has been detected. This drift amount is to be the movement amount of the movable body in the Z-axis direction without any changes. Accordingly, positional information of the movable body in the Z-axis direction can be measured, based on the modulation degree that is detected.

In this case, positional information (movement distance) in the Z-axis direction can be obtained based on the difference, proportion or the like of the first modulation degree and the second modulation degree as in the embodiment.

The amplitude of vibration mirror 14 affects the detection sensitivity of such drift amount of movement scale 24 in the Z-axis direction (or the movement distance of the movable body in the Z-axis direction). Accordingly, it is preferable that the amplitude of vibration mirror 14 is set to a magnitude in which such detection sensitivity becomes highest.

When deciding the amplitude of vibration mirror 14, the amplitude of vibration mirror 14 should be actively changed and Z measurement of the movable body (movement scale 24) should be performed a plurality of times, and then the amplitude whose detection accuracy is highest can be obtained as the optimal amplitude. Further, amplitude that has a large change ratio can be obtained by observing the change ratio of the modulation degree depending on the amplitude, and the amplitude can be obtained as the optimal amplitude.

Measurement of the drift of the movement scale in the Z-axis direction (the movement distance of the movable body in the Z-axis direction) based on the modulation degree can also be applied to an encoder that employs other methods (such as an encoder by an optical pick up method or the like), other than the encoder by the diffraction interference method related to the embodiment.

Further, the measurement of the drift amount in the Z-axis direction based on the modulation degree described in the embodiment and measurement of the drift amount of the movement scale in the Z-axis direction according to astigmatism by the optical pick up method can be combined together, and the detection accuracy of the drift amount can be improved using measurement values obtained in one of the measurements for calibrating the measurement values obtained in the other measurement.

Figure 11:
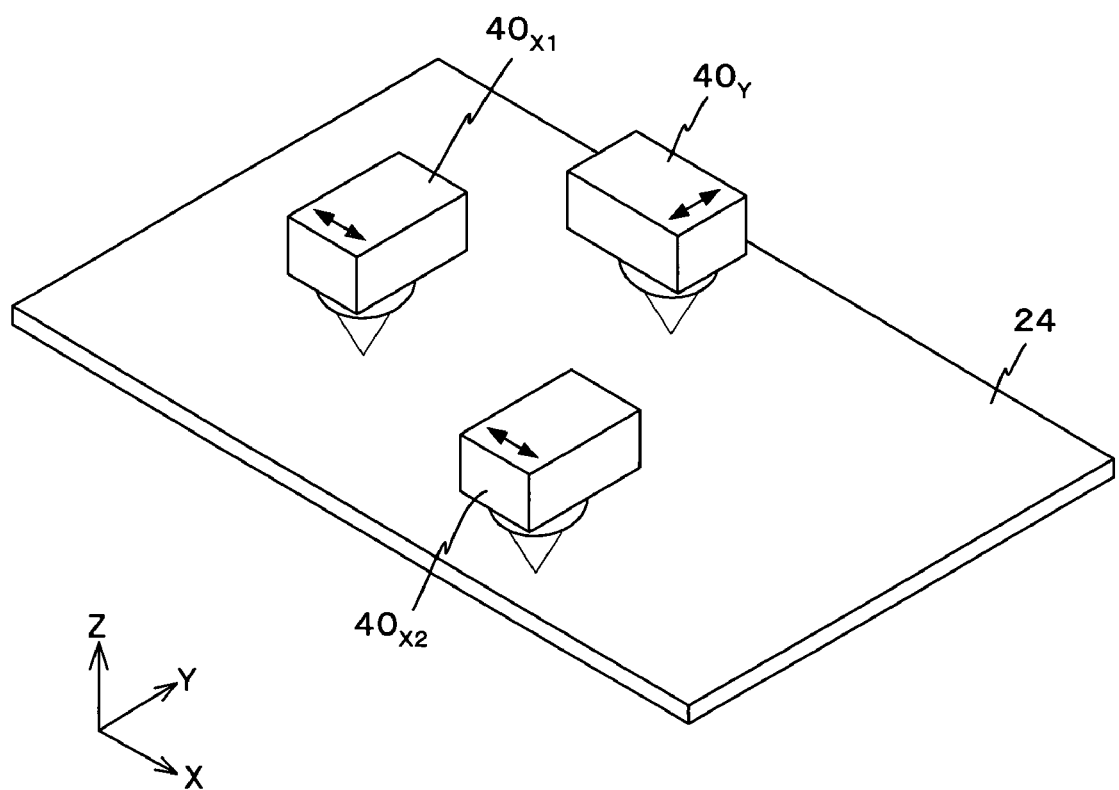
FIG. 11 is a view used for describing a method for measuring the gradient of movement scale 24.

Further, by performing the measurement of the drift amount in the Z-axis direction at a plurality of places on the scale, pitching and rolling can also be measured. As an example, as is shown in FIG. 11, three heads $40_{X1}$, $40_{X2}$, and $40_{Y}$, for example, can be used to perform measurement at three points that are not on the same straight line on movement scale 24, and in addition to displacement measurement of movement scale 24 in the X-axis direction by heads $40_{X1}$ and $40_{X2}$ and displacement measurement of movement scale 24 in the Y-axis direction by head $40_{Y}$, the roll (rotation around the X-axis), the pitch (rotation around the Y-axis), and the yaw (rotation around the Z-axis) of the movement scale can be measured. In the case error characteristics, which accompany the gradient of the encoder, is known, by feeding back such gradient information (roll, pitch, and yaw) to the encoder output, or by correcting the gradient information with an upper processing circuit system, it becomes possible to perform correction of not only the displacement in the Z-axis direction, but also the errors in the X-axis direction and the Y-axis direction.

The position of movement scale 24 in the Z-axis direction can be adjusted based on the computation results of the detection unit. By this adjustment, the drift of movement scale 24 in the Z-axis direction can be suppressed, and positional information of movement scale 24 in the X-axis direction can be detected with high precision.

In the embodiment above, the case has been described where movement scale 24 and reference scale 25 are a transmissive type scale. The present invention, however, is not limited to this, and movement scale 24 can also be a reflection type scale. In this case, the light reflected by movement scale 24 is reflected off a beam splitter or the like, and photodetection element 26 can be arranged on the optical path of the reflection light. In this case as well, measurement similar to the embodiment can be performed. Further, the side of reference scale 25 can be a reflection type scale, or both the movement scale 24 and reference scale 25 can be a reflection type scale.

Further, in the embodiment above, vibration mirror 14 was employed. However, instead of vibration mirror 14, a crystal, a tuning fork crystal or the like can be used. The point is that the unit used does not matter, as long as the unit has a mechanism of periodically changing the incident angle of the laser beam incident on index scale 20 and 21. For example, a plurality of point light sources arranged in a row can be used as a light source, and each point light source can be periodically lighted.

Further, in the embodiment above, the proceeding direction of the laser beam was changed so that the incident angle to index scale 20 was periodically vibrated. However, the proceeding direction of the laser beam can be fixed, and the attitude of index scale 20 can be rotationally vibrated periodically.

Further, the mechanism of detecting the drift of movement scale 24 in the Z-axis direction can also be applied to encoders other than encoder 10 in the embodiment above. For example, the mechanism can also be applied to an encoder that has drive unit 16 for driving vibration mirror 14 removed and the vibration mirror changed to a reflection mirror, so that instead of vibrating the mirror, light source 12 is periodically vibrated along the Z-axis.

Further, the present invention can also be applied to an encoder that makes collimator lens 18 periodically vibrate along the X-axis without vibrating light source 12. Further, the present invention can also be applied to an encoder that makes the proceeding direction or the passing position of the laser beam vibrate periodically by placing an acoustic optical module (AOM) or an electro-optical module (EOM) in between light source 12 and collimator lens 18.

Further, in the embodiment above, the grating pitch of the diffraction grating of movement scale 24 and reference scale 25 was the same, however, the present invention is not limited to this, and different grating pitches can be employed. In such a case, conversion factor k in equation (1) described earlier should be changed.

Further, in the embodiment above, the case has been described where movement scale 24 was moved. However, the present invention is not limited to this, and the present invention can also be applied to the case where components other than movement scale 24 are moved, as long as the configuration to be employed is a configuration in which movement scale 24 and other optical members are moved relatively.

Further, in the embodiment above, the case has been described where the encoder is equipped with only one set of movement scale 24 and the corresponding photodetection element 26 that form a pair and only one set of reference scale 25 and the corresponding photodetection element 27 that also form a pair, however, the present invention is not limited to this. For example, two or more sets of the former pair can be prepared, or two or more sets of the latter pair can be prepared, or two or more sets of each of the pairs can be prepared. In this case, the measurement values obtained by each photodetection element can be averaged, and measurement with higher precision can be performed, such as by using the averaged value and correcting the movement information of the movement scale, or the values can be used for other types of measurement.

In the embodiment above, the case has been described where index scales 20, 21, 22, and 23, movement scale 24, and reference scale 25 each have a phase grating, however, the present invention is not limited to this, and an amplitude diffraction grating (contrast diffraction grating) can also be employed. Further, the amplitude diffraction grating and the phase grating can be mixed. Further, as each scale, a transparent substrate on which a metal (e.g. chromium) pattern is formed can be employed.

As is described so far, various kinds of modifications are possible for the placement of the optical system in an encoder. Because of space limitations, in the embodiment above or the like, various optical elements in the encoder were all arranged within the XZ plane, however, the present invention is not limited to this, and the various optical elements that guide the diffracted lights generated in index scale 20 onto movement scale 24 can naturally be arranged three-dimensionally.

In the embodiment above, ± first-order diffracted lights were used as the measurement light. However, the present invention is not limited to this, and an interference light of diffracted lights of a higher order can also be used as the measurement light, or an interference light of diffracted lights of a different order such as in a $0^{th}$ order and an $n^{th}$ order (or a $-n^{th}$ order), or in a $+n^{th}$ order and a $+(m+n)^{th}$ order, can also be used as the measurement light.

Further, the encoder related to the embodiment above was a linear encoder that detects the positional information of a movable body in a uniaxial direction, however, the present invention can also be applied to a rotary encoder that detects the rotational amount of a rotational body.

The values of the wavelength of the laser beam and the grating pitch of each of the diffraction gratings in the embodiment above are mere examples, and the values are appropriately decided according to the resolution required in the encoder. In general, the smaller the grating pitch of the diffraction grating is, the better the resolution of the encoder becomes.

While the above-described embodiments of the present invention are the presently preferred embodiments thereof, those skilled in the art of lithography systems will readily recognize that numerous additions, modifications, and substitutions may be made to the above-described embodiments without departing from the spirit and scope thereof. It is intended that all such modifications, additions, and substitutions fall within the scope of the present invention, which is best defined by the claims appended below.

What is claimed is:

1. An encoder, comprising:
a first optical member on which an illumination light is incident and where a first light and a second light are generated;
a change unit that periodically changes an incident angle of the illumination light with respect to the first optical member; and
a second optical member that is relatively displaced with respect to the first optical member,
the change unit and the first and second optical members being configured such that
under a condition that the first light and the second light are generated from different positions of the first optical member, the first light and the second light are made to be incident on a same position of the second optical member and to interfere with each other, or
under a condition that the first light and the second light are generated from a same position of the first optical member, the first light and the second light are made to be incident on different positions of the second optical member and to interfere with each other.

2. The encoder of claim 1, wherein
the first optical member and the second optical member are diffraction gratings.

3. The encoder according to claim 1, further comprising:
a third optical member that guides the first light and the second light to the second optical member, wherein
the third optical member is one of a diffraction grating and a reflection optical element.

4. The encoder of claim 1, wherein
an optical distance of the second optical member with respect to the first optical member is measured by comparing an amplitude of a harmonic component included in a signal based on an interference light of the first light and the second light.

5. The encoder of claim 4, wherein
the optical distance of the second optical member with respect to the first optical member is measured at a plurality of points which are not on the same straight line, and a gradient of the second optical member with respect to the first optical member is measured.

6. The encoder of claim 1, further comprising a measurement unit that measures information related to a distance between the first optical member and the second optical member, based on photodetection results of light via the first optical member and photodetection results of light via the second optical member.

7. The encoder of claim 1, further comprising:
a branching optical system that branches the illumination light to emit a branched light;
a first photodetection system that receives the illumination light via the second optical member;
a reference scale whose positional relation with respect to the branching optical system is fixed, the branched light being made to be incident on the reference scale;
a second photodetection system that receives the branched light via the reference scale; and
a computing unit that computes positional information of the second optical member in an optical axis direction of the illumination light, based on photodetection results of the first photodetection system and photo detection results of the second photodetection system,
wherein
the second optical member is relatively displaced with respect to the branching optical system and has first patterns arranged along a relatively displaced direction,
the reference scale has second patterns arranged in a predetermined direction, and
the change unit changes a direction of the illumination light to a direction corresponding to an arrangement direction of the first pattern and an arrangement direction of the second pattern.

8. The encoder of claim 1, further comprising:
a branching optical system that branches the illumination light to emit a branched light;
a first photodetection system that receives the illumination light via the second optical member;
a reference scale whose positional relation with respect to the branching optical system is fixed, the branched light being made to be incident on the reference scale; and
a second photodetection system that receives the branched light via the reference scale.

9. The encoder of claim 1, further comprising:
a first reference scale on which a branched light that is a part of the illumination light is made to be incident; and
a second reference scale on which the branched light via the first reference scale is made to be incident.

* * * * *